United States Patent [19]

Mowrer et al.

[11] Patent Number: 5,760,155
[45] Date of Patent: Jun. 2, 1998

[54] POLYSILOXANE POLYURETHANE COMPOSITIONS

[75] Inventors: Norman R. Mowrer, La Habra; J. Luis Rojas, Anaheim Hills, both of Calif.

[73] Assignee: Ameron International Corporation, Pasadena, Calif.

[21] Appl. No.: 814,157

[22] Filed: Mar. 10, 1997

Related U.S. Application Data

[63] Continuation-in-part of Ser. No. 533,681, Sep. 26, 1995, abandoned.

[51] Int. Cl.⁶ .............. C08G 77/04; C08G 77/06; C08F 283/04; C08F 283/00
[52] U.S. Cl. .............. 528/28; 525/453; 525/474; 528/12; 528/18; 528/25
[58] Field of Search .............. 528/12, 18, 25, 528/28; 525/453, 474

[56] References Cited

U.S. PATENT DOCUMENTS

| | | | |
|---|---|---|---|
| 2,561,429 | 7/1951 | Sveda | 260/448.2 |
| 3,388,101 | 6/1968 | Wismer et al. | 260/77.5 |
| 3,404,130 | 10/1968 | Sigura et al. | 260/77.5 |
| 3,562,352 | 2/1971 | Nyilas et al. | 260/824 |
| 4,202,807 | 5/1980 | Moretto et al. | 260/29.1 |
| 4,334,052 | 6/1982 | Patton, Jr. et al. | 528/58 |
| 4,345,053 | 8/1982 | Rizk et al. | 525/440 |
| 4,622,369 | 11/1986 | Chang et al. | 525/440 |
| 4,623,697 | 11/1986 | Chang et al. | 525/61 |
| 4,631,329 | 12/1986 | Gornowicz et al. | 528/28 |
| 4,798,878 | 1/1989 | Brinkmann et al. | 528/28 |
| 4,804,732 | 2/1989 | Ryntz et al. | 528/28 |
| 4,839,443 | 6/1989 | Akutsu et al. | 525/474 |
| 4,877,855 | 10/1989 | Nagaoka et al. | 528/26 |
| 4,902,736 | 2/1990 | Nonaka et al. | 524/296 |
| 4,916,199 | 4/1990 | Bandlish et al. | 528/28 |
| 4,942,212 | 7/1990 | Hanada et al. | 528/28 |
| 4,999,412 | 3/1991 | Neale et al. | 528/28 |
| 5,112,874 | 5/1992 | Schlak et al. | 521/51 |
| 5,112,930 | 5/1992 | Lëdemann et al. | 528/28 |
| 5,128,408 | 7/1992 | Tanaka et al. | 525/54.2 |
| 5,208,313 | 5/1993 | Krishnan | 528/28 |
| 5,238,732 | 8/1993 | Krishnan | 428/267 |
| 5,239,036 | 8/1993 | Krishnan | 528/28 |
| 5,239,037 | 8/1993 | Krishnan | 528/28 |

*Primary Examiner*—Patrick Niland
*Attorney, Agent, or Firm*—Christie, Parker & Hale, LLP

[57] ABSTRACT

A polysiloxane polyurethane composition is prepared by combining in the presence of water and in a predetermined proportion an organic di- or polyisocyanate, a polyol, an hydroxyl-containing silicon material having the hydroxyl groups attached directly to a silicon atom, an organotin catalyst, an amine catalyst, a methoxy-functional silicone intermediate, and a carbinol. If desired, various different fillers, pigments, solvents, and additives for enhancing pigment wetting and flow control and the like can also be used to prepare the coating. The chemical ingredients are combined together to undergo chemical reaction to form silanol-functionalized urethane prepolymers that cure at ambient temperatures in the presence of moisture to form a polysiloxane polyurethane composition having enhanced properties of chemical and weather resistance, high tensile and tear strength, and high elongation.

20 Claims, 1 Drawing Sheet

POLYSILOXANE POLYURETHANE COMPOSITIONS

RELATION TO PATENT APPLICATION

This patent application is a continuation in part to U.S. patent application Ser. No. 08/533,681 filed on Sep. 12, 1995 now abandoned.

FIELD OF THE INVENTION

The invention relates to moisture-curable urethane compositions and, more particularly to polysiloxane polyurethane compositions having improved chemical resistance and weatherability, improved film build capability, and having high tensile strength, elastomeric properties and elongation when compared to conventional urethane compositions.

BACKGROUND OF THE INVENTION

Urethane compositions are known to have outstanding abrasion, impact, weather and chemical resistance, combined with excellent tensile and tear strength and high elongation. The combination of such properties has made such compositions commercially accepted as specialty coatings for applications in the textile, paper, automotive, sports and recreation, wood, civil engineering and construction, marine and industrial maintenance coatings markets.

The basic raw materials used to prepare conventional binders for a two-component or two-package elastomeric polyurethane coating system includes: (a) an aliphatic or aromatic di-or polyisocyanate; and (b) a coreactant or curative component having active hydrogen containing groups, e.g., hydroxyl, amine groups, or latent active hydrogen containing groups, e.g., oxazolidines or ketimines. Typically, the coreactant is an oligomer having at least one hydroxyl group and is selected from the general classes of polyesters, polyethers, alkyd resins and acrylics. The coreactant is usually the vehicle chosen for pigment grinding and may also contain other additives such as catalysts, plasticizers, antioxidants and ultra-violet (UV) stabilizers, bituminous extenders, suspending agents, antiskinning agents, surfactants and rheological modifiers.

A disadvantage of using an amine cured binder is the inherent high reactivity of isocyanate, particularly aromatic isocyanate, with amine containing materials. Accordingly, coating systems formed using an amine-cured binder often react so quickly that application can be accomplished only with specialized plural component spray equipment. Additionally, amine cured systems have a tendency to yellow upon exposure to sunlight, which precludes their use in applications where color stability is required.

A disadvantage of using a hydroxyl cured binder to prepare the coating system is that the oligomer containing the hydroxyl group and any water present in the system have similar reactivity with the di-or polyisocyanate ingredient. Accordingly, any moisture on the substrate to be coated, atmospheric moisture in the coating environment compete with the oligomer for the available isocyanate groups. Moisture can, therefore, inhibit the cure process of the coating, resulting in slow or partial cure, reduced surface gloss, and compromised performance. The reaction of di-or polyisocyanates with water also produces carbon dioxide gas which can cause bubble formation in the coating. Bubbles formed in the coating are typically unable to travel to the coating surface and are entrapped, creating micro voids in the coating structure. These micro voids are undesirable because they increase the coating's permeability to water and, thus reduce its corrosion protection. The microvoids also compromise the physical integrity of the coating, resulting in lower tensile strength, decreased elongation and reduced abrasion resistance. Limited pot-life is another disadvantage of using a hydroxyl cured binder.

Binders used to form one-component or one-package moisture-cured elastomeric polyurethane coating systems are known in the art and generally comprise isocyanate-terminated prepolymers or quasi-prepolymers. These polymers are prepared by reacting an aromatic or aliphatic di-or polyisocyanate with an oligomer of the type described above. Moisture scavenging agents, plasticizers and other additives are added to obtain a very low moisture content and, thereby obtain optimum package stability.

Binders used to one-component moisture cured-elastomeric urethane coatings are believed to cure by the reaction of water with the isocyanate which liberates carbon dioxide gas. While this reaction is of importance in the formation of foamed microcelluar urethane products, it makes it difficult to obtain a continuous, bubble free protective coating, and generally limits applied dry film thickness to less than about eight millimeters.

Both the one-component and two-component elastomeric urethane coating systems often include volatile organic solvents to lower the coating viscosity and, thereby, provide a consistency suitable for spray application with conventional air, airless and electrostatic spray equipment.

Known methods have been used to reduce carbon dioxide generated bubble formation in both one-and two-component elastomeric urethane coating systems. One such method has been to incorporate a ketimine, aldimine or oxazolidine ingredient. The ketimines and aldimines are Schiff's bases derived from a ketone or aldehyde, respectively. Mono, di-or polyoxazolidines are also used. Upon exposure to moisture, oxazolidines hydrolyze to form a hydroxylamine, while ketimines and aldemines produce amine and the corresponding ketone or an aldehyde. The hydroxylamine and amine thus produced react with the di-or polyisocyanate to form the polyurethane and poly(urea)urethane. Hydrolysis of ketimine, aldemine and oxazolidine, and subsequent reaction of amine or hydroxylamine with isocyanate, is inherently faster than the reaction of isocyanate with water which thus eliminates or reduces carbon dioxide generation and bubble formation. Very thick coatings with a wide range of properties can be prepared in this manner.

While use of ketimines, aldemines and oxazolidines may be regarded as an improvement in conventional one-and two-component urethane elastomeric coating system, they do have some inherent disadvantages. Use of ketimines and aldemines often produce coatings that have a tendency to yellow upon exposure to sunlight, and that have an increased time to achieve complete cure and retain slow evaporating ketones or aldehydes in the film for some time. Oxazolidine modification can also result in some yellowing and reduced chemical resistance to some acids.

Another method used to reduce carbon dioxide generation and bubble formation has been to end cap isocyanate-terminated prepolymers or quasi-prepolymers with an amino-functional alkoxysilane. Carbon dioxide generation and bubble formation in the coating is precluded since the isocyanate group is prereacted. These coatings cure by hydrolysis of the alkoxysilane end capped urethane to form the corresponding silanols and an alcohol, with subsequent condensation of silanol end capped urethane to form polyurethane-polysiloxane polymer and water. The polyurethane-polysiloxane coatings so produced generally have good tensile and tear strength, good chemical resistance and excellent adhesion to many substrates. However, because of the relatively large amount of amino alkoxysilane used to end cap the isocyanate, these coatings have an inherent tendency to yellow on exposure to sunlight and have an high degree of cross linking which results in limited elongation.

Another disadvantage of both the one-and two-package elastomeric urethane coatings is the presence of isocyanate. Health hazards associated with exposure to isocyanates include severe irritation of the skin, eyes, gastrointestinal tract and respiratory systems. Many isocyanates have high chronic inhalation toxicity and, as a result, airborne threshold limit values in the 0.01 ppm range have been established for many isocyanates. Thus, spray application of isocyanate based coating materials presents a health hazard which may require the use of air supplied respirators or other specialized equipment in cretin instances. Additionally, certain isocyanates are now considered suspect carcinogens. Further, Title III of the 1990 Clean Air Act Amendments lists certain isocyanates among 190 materials that the EPA has labeled Hazardous Air Pollutants (HAPS) for which emissions must be reduced. None of the modified elastomeric urethane coatings discussed above eliminate isocyanate and, therefore, present the same health hazards associated with conventional elastomeric urethane coatings.

In view of the foregoing problems, it is desirable to provide a moisture-curable urethane composition that, when used as a coating, does not yellow upon exposure to sunlight, and that eliminates any isocyanate related health hazard. It is also desirable to provide a moisture-curable urethane composition having improved resistance to chemical and weather exposure and which also exhibits high tensile and tear strength and high elongation. It is, further desirable to provide a moisture-curable urethane composition which eliminates carbon dioxide generated bubble formation and entrapment to permit application film thicknesses greater than previously possible using prior known moisture-curable elastomeric urethanes.

SUMMARY OF THE INVENTION

This invention comprises a moisture-curable polysiloxane polyurethane composition prepared by combining in the presence of water an organic di-or polyisocyanate, a polyol, a hydroxyl-containing silicon material having the hydroxyl groups attached directly to a silicon atom, an organotin catalyst, an amine catalyst, a methoxy-functional silicone intermediate, and a carbinol. If desired, various different fillers, pigments, solvents, and additives for enhancing pigment wetting and flow control and the like can also be used to prepare the composition.

The organic di-or polyisocyanate ingredient useful in preparing the composition has the general formula

OCN—R$_1$—NCO where R$_1$ may be selected from the group including aliphatic, cycloaliphatic, or aromatic groups, where the di- or polyisocyanate ingredient has a weight average molecular weight in the range of from about 200 to 2,000.

The polyol ingredient useful in preparing the composition has the general formula

HO—R$_2$—OH where the R$_2$ group may be selected from the group including polyester, polyether, polyalkyldiene, and glycol groups, and where the polyol has a weight average molecular weight in the range of from about 200 to 5,000.

Hydroxyl-containing silicon material may be selected from the group consisting of: (a) silanol materials having the formulas where R$_3$ may comprise organic radicals selected from the group including allyl, alkyl, cycloalkyl, aryl, alkaryl or aralyl radicals; (b) siloxanol materials having the formulas where each R$_5$ group may comprise a hydrocarbon radical selected from the group including alkyl, alkenyl, cycloalkyl, aryl, alkaryl, or aralkyl radicals, and where n$_1$ may be an integer in the range of from one to about thirty; (c) silicon materials having two or more silicon atoms attached through divalent organic radicals such as those having the formula where each R$_6$ group may comprise another OH group or may comprise a hydrocarbon radical selected from the group including alkyl, cycloalkyl, aryl, alkaryl, and aralkyl radicals, where R$_7$ may comprise a divalent organic radical selected from the group including methylene, polymethylene, aralyene, polyaralyene, cycloalkylene, and polycycloalkylene; and (d) silanol-functional silicone intermediates having the formula where each R$_8$ is independently selected from the group consisting of hydrogen, alkyl, and aryl groups having up to about twelve carbon atoms, where each R$_9$ is independently selected from the group consisting of the hydroxy, alkyl, and aryl groups having up to about six carbon atoms, and where n$_2$ is selected so that a weight average molecular weight is in the range of from about 500 to 15,000.

The organotin catalyst has the general formula where R$_{10}$, R$_{11}$, R$_{12}$, and R$_{13}$ are selected from the group including alkyl, aryl, and alkoxy groups having up to about eleven carbon atoms, and where any two of $R_{10}$, $R_{11}$, $R_{12}$, and $R_{13}$ are also selected from a group of inorganic atoms including halogens, sulfur, and oxygen.

The amine catalyst is selected from the group including tertiary amines and aminosilanes having the general formula where $R_{14}$ is selected from the group including aliphatic and aromatic amines comprising in the range of from one to six nitrogen atoms and in the range of from one to six carbon atoms, where $R_{15}$, $R_{16}$, and $R_{17}$ are independently selected from the group including alkoxy and aryloxy groups having up to about twelve carbon atoms.

The methoxy-functional silicone intermediates have the general formula where each $R_{18}$ group is independently selected from the group including alkyl, aryl, and alkoxy groups having up to about six carbon atoms, where each $R_{19}$ is independently selected from the group including hydrogen, alkyl, and aryl groups having up to about twelve carbon atoms, and where $n_4$ is selected so that the weight average molecular weight of the silicone intermediate is in the range of from about 500 to 6,000.

The chemical ingredients are combined together and react to form silanol-functionalized urethane prepolymers that cure at ambient temperatures in the presence of moisture to form polysiloxane polyurethane compositions of the present invention. The resulting polysiloxane polyurethane composition does not present an isocyanate related health hazard, has improved resistance to chemical and weathering exposure, exhibits high tensile and tear strength, and high elasticity and elongation. The composition, prepared in this manner, eliminates carbon dioxide generated bubble formation and entrapment and is, therefore, capable of being applied as a coating at much greater thicknesses than prior known moisture-curable urethane compositions.

BRIEF DESCRIPTION OF THE DRAWINGS

These and other features and advantages of the invention will become appreciated as the same becomes better understood with reference to the specification, claims and drawings wherein:

DETAILED DESCRIPTION OF THE INVENTION

Polysiloxane polyurethane compositions for providing enhanced chemical resistance, weatherability, abrasion resistance, and impact resistance to the surface of a substrate, when applied as a coating, and to the body of a device, when used to form a composite, may have as significant ingredients an isocyanate-terminated urethane prepolymer and a hydroxyl-containing silicon material. A preferred polysiloxane polyurethane composition may be prepared according to the principles of this invention by combining:

(a) an organic di-or polyisocyanate having the general formula where the $R_1$ group may be selected from the group including aliphatic, cycloaliphatic, or aromatic groups, and where the di-or polyisocyanate ingredient has the weight average molecular weight in the range of from about 200 to 2,000; with (b) a polyol having the general formula where the $R_2$ group may be selected from the group including polyester, polyether, polyalkyldiene, and glycol groups, and where the polyol has the weight average molecular weight in the range of from about 200 to 5,000; with (c) a hydroxyl (OH) containing silicon material including those materials wherein the OH group or groups are attached directly to the silicon atom, such as the silanol materials having the general formulas where $R_3$ may comprise organic radicals selected from the group including allyl, alkyl, cycloalkyl, aryl, alkaryl or aralyl radicals.

Another preferred group of hydroxyl-containing silicon materials are silicon materials having two or more OH groups attached directly to the silicon atom such as the siloxanol materials having the general formula and where each $R_5$ group may comprise a hydrocarbon radical selected from the group including alkyl, alkenyl, cycloalkyl, aryl, alkaryl, or aralkyl radicals, and where $n_1$ may be an integer in the range of from one to about thirty.

Another preferred group of hydroxyl-containing silicon materials are materials comprising two or more OH groups attached to a silicon atom that have two or more silicon atoms attached through divalent organic radicals such as those having the general formula where each $R_6$ group may comprise another OH group or may comprise a hydrocarbon radical selected from the group including alkyl, cycloalkyl, aryl, alkaryl, and aralkyl radicals, where $R_7$ may comprise a divalent organic radical selected from the group including methylene, polymethylene, aralyene, polyaralyene, cycloalkylene, and polycycloalkylene.

A particularly preferred class of hydroxyl-containing silicon materials are silanol-functional silicone intermediates having the general formula where each $R_8$ is independently selected from the group consisting of hydrogen, alkyl, and aryl groups having up to about twelve carbon atoms, where each $R_9$ is independently selected from the group consisting of the hydroxy, alkyl, and aryl groups having up to about six carbon atoms, and where $n_2$ is selected so that the weight average molecular weight is in the range of from about 500 to 15,000; with (d) an organotin catalyst having the general formula where $R_{10}$, $R_{11}$, $R_{12}$, and $R_{13}$ are selected from a group including alkyl, aryl, and alkoxy groups having up to about eleven carbon atoms, and where any two of $R_{10}$, $R_{11}$, $R_{12}$, and $R_{13}$ are also selected from a group of inorganic atoms including halogens, sulfur, and oxygen; with (e) a tertiary amine catalyst or an aminosilane having the general formula where $R_{14}$ is selected from the group including aliphatic and aromatic amines comprising in the range of from one to six nitrogen atoms and in the range of from one to six carbon atoms, where $R_{15}$, $R_{16}$, and $R_{17}$ are independently selected from the group consisting of alkoxy and aryloxy groups having up to about twelve carbon atoms; with (f) methoxy-functional silicone intermediates having the general formula where each $R_{18}$ group is independently selected from the group including alkyl, aryl, and alkoxy groups having up to about six carbon atoms, where each $R_{19}$ group is independently selected from the group including hydrogen, alkyl, and aryl groups having up to about twelve carbon atoms, and where $n_4$ is selected so that the weight average molecular weight is in the range of from about 500 to 6,000; with (g) a carbinol having an average of at least two carbon bonded hydroxy groups per carbinol and an weight average molecular weight in a range of from 60 to 10,000; with (h) fillers and pigments; with (I) a solvent such as a non-alcoholic solvent; with (j) various different types of additives for enhancing pigment wetting, flow control and the like.

With respect to the organic di-or polyisocyanate ingredient, it is desired that the weight average molecular weight be within the above identified range to facilitate the reactions between the polyisocyanate and the polyol. The polysiloxane polyurethane composition prepared according to principles of this invention may comprise in the range of from two to fifty percent by weight of the polyisocyanate ingredient. The polyisocyanate ingredient serves to enhance the chemical and weathering resistance of the composition. A composition comprising less than about two percent by weight of the polyisocyanate has been shown to produce a composition that does not display the desired degree of chemical or weathering resistance. A composition comprising more than about fifty percent by weight of the polyisocyanate has been shown to produce cured product that may be too brittle for such applications as a coating, composite binder or the like.

The preferred amount of polyisocyanate ingredient used to form compositions of this invention depends on the particular application. For example, when used as a coating to form a membrane for concrete, it is desired that the composition have a low hardness of approximately 30–50 Rockwell A, formed by using in the range of from three to five percent by weight of the polyisocyanate ingredient. As another example, when used as a coating to form an abrasion resistant hopper car lining, it is desired that the composition have a hardness of approximately 80 Rockwell A to 50 Rockwell D, formed by using in the range of from six to eight percent by weight of the polyisocyanate ingredient. As another example, when used to form an elastomeric concrete coating for exterior resistance, the composition is formed by using in the range of from ten to twelve percent by weight of the polyisocyanate ingredient.

Figure 1:
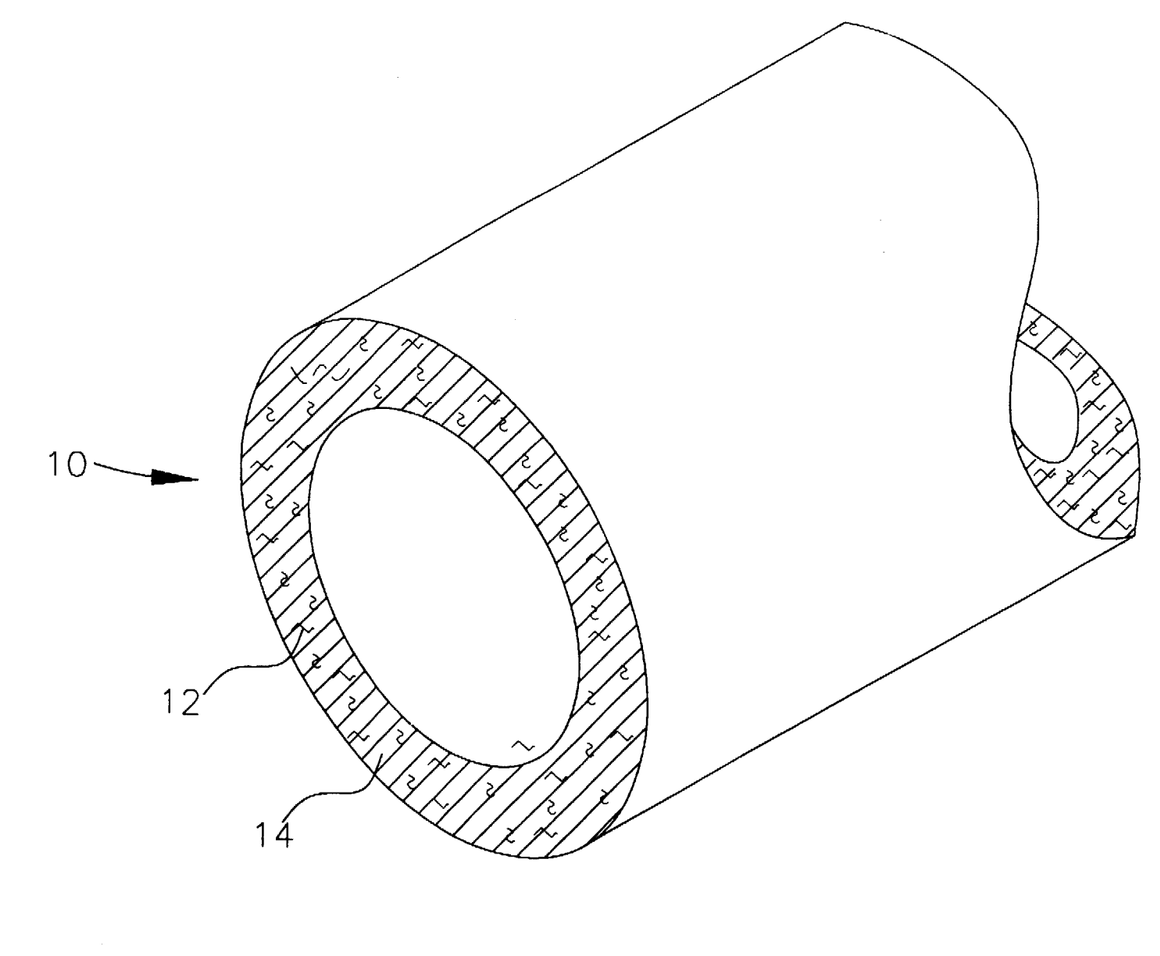
FIG. 1 is an isometric view of a flexible hose comprising a polysiloxane polyurethane binder composition prepared according to principles of this invention.

As another example, compositions of this invention can be used as a binder for reinforcing particles, members, or elements in composite articles. In one embodiment, the composition can be used as a binder for fiberglass, chopped glass fiber and the like to form a hose 10 having improved flexibility, impact resistance, chemical resistance, weatherability, and elasticity when compared to conventional hoses. In such an embodiment, the hose 10 may comprise in the range of from about 60 to 80 percent by weight reinforcing material 12, and in the range of from about 20 to 40 percent by weight binder 14. The hose can be formed using conventional manufacturing techniques by molding process, extrusion process, or the like.

Although compositions of this invention have been specifically described and illustrated as being used to form a composite article comprising a flexible hose, it is to be understood within the scope of this invention that applications of the composition in forming composites are not limited to flexible hoses, and can include any type of composite article where improved properties of flexibility, impact resistance, weatherability, chemical resistance, and elasticity is desired.

Any suitable organic di- or polyisocyanate, either aliphatic, cycloaliphatic or aromatic, may be used to form the composition. Suitable organic polyisocyanates include polymethylene polyphenyl isocyanate, 2,4 and 4,4-diphenylmethane diisocyanate (MDI) and liquid carbodiimide and uretonimine modified MDI variants, 2,4 and 2,6-toluene diisocyanate (TDI), paraphenylene diisocyanate, napthylene diisocyanate, dianisidine diisocyanate, xylylene disocyanate (XDI), lysine diisocyanate, tetramethyl-meta-xylylene diisocyanate (M-TMSDI), dimeryl diisocyanate (DDI), 3-isocyanatomethyl 3,5,5-trimethylcyclohexy isocyanate (IPDI), bis (4-isocyanatocyclohexyl) methane (Desmodur W), hexamethylene diisocyanate, and hexamethylene diisocyanate biurets and isocyanurates, i.e., Desmodur N-100, Desmodur N-3200 and Desmodur N-3300 from Miles, Inc., Pittsburgh, Pa.

Aromatic di- or polyisocyanates are preferred for compositions where optimum chemical resistance is desired. Preferred aromatic di-or polyisocyanates are toluene diisocyanate, paraphenylene diisocyanate, polymethylene polyphenyl isocyanate and 2,4' and 4,4'-diphenylmethane diisocyanate (MDI) and liquid carbodimide and uretonimine modified MDI variants.

Aliphatic di- or polyisocyanates are preferred for compositions where optimum weathering resistance is desired. Preferred aliphatic di- and polyisocyanates include 3-isocyanatomethyl 3,5,5-trimethylcyclohexyl isocyanate (IPDI), bis (4-isocyanato cyclohexyl) methane (Desmodur W), tetramethyl-meta-xylylene diisocyanate (M-TXMDI) and hexamethylene diisocyanate biurets and isocyanurates i.e. Desmodur N-100, Desmodur N-3200, and Desmodur N-3300. A preferred polyisocyanate is 3-isocyanatomethyl 3,5,5-trimethylcyclohexyl isocyanate produced by Huls America of Piscontaway, N.J., under the product name Vestamin IPDI.

With respect to the polyol ingredient, it is desired that the polyol have a weight average molecular weight as described above to facilitate reaction with the polyisocyanate. A composition prepared according to principles of this invention may comprise in the range of from two to sixty percent by weight polyol. The polyol ingredient enhances the percent elongation, modulus of elasticity, resilience, chemical resistance, weatherability, and hydrolytic stability of the composition. Using less than about two percent by weight of the polyol will produce a composition having high levels of isocyanate and silanol, causing the composition to be too brittle for application as an elastomeric coating. Using greater than about sixty percent by weight of the polyol will produce a cured composition that is soft and not well suited for most applications.

The polyisocyanate and polyol are reacted to form an isocyanate-terminated polyurethane prepolymer useful in the present invention. As used herein, an isocyanate-terminated urethane prepolymer refers to compounds having at least one isocyanate group per molecule which yields polyurethane and/or poly(urea)urethane linkages upon reaction or curing. A summary of prepolymer chemistry and technology can be found in *Polyurethanes: Chemistry and Technology*, Saunders and Frisch, Interscience Publishers, New York, 1963 (Part I) and 1964 (Part II) and *Polyurethanes Handbook*, Gunther Oertel, Hansor Publishers, New York, 1985.

Polyols used to make the isocyanate-terminated urethane prepolymers or quasi-prepolymers may include polyoxyalkylene ether glycols, polyester glycols, polycaprolactone glycols, polycarbonate glycols, castor oils, polybutadiene glycols, acrylic polyols and glycols and polyetherthioether glycols of which the following are mentioned as non-limiting examples:

polytetramethylene ether glycols, MW 650–2900, polypropylene ether glycols, MW 400–4000, castor oil and castor oil derivatives, MW 300–1000, polycaprolactone glycols, MW 300–2000, hydroxyl terminated bisphenol A polyols, MW 400–1000, polycarbonate glycols, MW 500–2500, polyetherthioether glycols, MW 400–2000, hydroxyl-containing polyacrylates and polymethacrylates, equivalent weight 400–4000, polybutylene ether glycols, MW 400–4000, and polyoxyethylene-propylene copolymer ether glycols, MW 400–4000.

Polyester glycols are reaction products of polyhydric alcohols, such as ethylene glycol, propylene glycol, diethylene glycol, dipropylene glycol, 1,4-butanediol, 1,3-butanediol, pentanediol, 1,6-hexanediol, dodecanediol, polyethylene glycol, polypropylene glycol, polytetramethylene glycol, neopentyl glycol, 2,2,4-trimethylpentanediol, hydrogented bisphenol A, propylene oxide addition products of bisphenol A, glycerin, trimethylolethane, trimethylolpropane, pentaerythritol, and trishydroxyethyl isocyanurate, and a polycarboxylic acid, polycarboxylic acid anhydride, or alkyl ester of a polycarboxylic acid, such as phthalic anhydride, isophthalic acid, terephthalic acid, dimethyl terephthalic acid, succinic acid, adipic acid, azelaic acid, dimer acid, maleic anhydride, fumaric acid, itaconic acid, tetrahydrophthalic acid, anhydrous hexahydrophthalic acid, methyl nadic acid anhydride, trimellitic anhydride, pyromellitic anhydride, and butanetetracarboxylic acid, in a mixing proportion where the hydroxyl groups are in excess.

Also permissible in combination are, e.g., monobasic acids such as fatty acids, benzoic acid, and tertiary butyl benzoic acid, monoalcohols such as octanol, lauryl alcohol, and oleyl alcohol, hydroxycarboxylic acids such as hydroxystearic acid, parahydroxybenzoic acid, and metahydroxybenzoic acid. Monomoric glycols may be blended with polyols and include ethylene glycol, propylene glycol, diethylene glycol, triethylene glycol, dipropylene glycol, trimethylene glycol, 1,3- and 1,4-butanediol, 1,5-pentanediol, 1,2-hexylene glycol, 1,10-decandediol, 1,2-cyclohexanediol, 3-cyclohexane-1,1-dimethanol, 4-methyl-3-cyclohexane-1,1-dimethanol, 3-methylene-1, 5-pentanediol, (2-hydroxypropoxy) 1 propanol, 4-(2 hydroxyethoxy)-butano, 5-(2hydroxypropoxy)-1-pentanol, 1-(2-hydroxy-methoxy) 2-hexanol, 1-(2-hydroxypropoxy)-2-octanol, 3-allyloxy-1, 5-pentanediol, glycerin 1,2,6-hexanetriol, 1,1,1-trimethylolethane, 1,1,1-trimethylolpropane, pentaerythritol, sorbitol, sucrose, lactose, c-methyl glucoside, novolac resins and hydroxy-terminated caprolactone.

Preferred polyols used in making isocyanate-terminated polyurethane prepolymers of the present invention included polyoxyethylene propylene copolymer ether glycols (Olin Chemical, Stanford, Conn.), polybutylene ether glycols (Dow Chemical, Midland, Mich.), castor oil and castor oil derivatives (Caschem, Inc., Bayonne, N.J.), polyester polyols (Miles, Inc., Pittsburgh, Pa. and Witco Chemical, Chicago, Ill.) polycaprolactone glycols (Union Carbide, Danbury Conn.) and hydroxyl-terminated bisphenol A polyols (Milliken Chem). A particularly preferred polyol is polyethylene propylene ether glycol produced by ARCO Chemical of Philadelphia, Pa. under the product name ARCO 1025.

Isocyanate-terminated urethane prepolymers and quasi-prepolymers are also available from a number of commercial sources including Miles, Inc., Air Products (Ambler, Pa.,) Hexcel (Dublin, Calif.), Uniroyal (Naugatuck, Conn.), Dow Chemical, Essex Specialty Products (Clifton, N.J.) and Polyurethane Corporation of America (Everett, Mass.). Isocyanate-terminated urethane prepolymers from Air Products available under the product name Airthane are preferred because of their low free monomeric isocyanate content and low viscosities.

With respect to the hydroxyl-containing silicon material, it is to be understood that the composition of this invention can be prepared using a silanol material, a siloxanol material, a silicon material having two or more silicon atoms attached through divalent organic radicals, a silanol-functional silicone intermediate, and combinations thereof.

With respect to the silicon material, suitable silanol materials include diphenyldihydroxy silane, dicyclohexyldihydroxy silane and phenyltolyldihydroxy silane, xylytrihydroxy silane and phenyltrihydroxy silane. With respect to the hydroxyly-containing silicon material comprising siloxanol, suitable materials include tetramethyldisiloxane diol, tetra phenyldisiloxane diol, diphenyldimethyldisiloxane diol, dibutyldiphenyl disiloxane diol and the like. A preferred siloxanol is diphenyldimethyldisiloxanediol produced by Huls America.

With respect to the hydroxyl-containing silicon material having two or more silicon atoms attached through divalent organic radicals, suitable materials include ethylenebis(trihydroxysilane), p-phenylene-bis-(dimethyl) hydroxysilane), p-cyclohexylene-bis(dibutyl) hydroxsilane) and 1,6-hexamethylene-bis-(dimethylhydroxysilane). The preparation of many of these compounds is illustrated in U.S. Pat. No. 2,561,429, which is herein incorporated by reference. A preferred hydroxyl-containing silicon material is p-phenylene-bis-(dimethyl) hydroxysilane produced by Huls America.

Suitable silanol-functional silicone intermediates have a silanol content in the range of from one to six percent and are exemplified by such commercially available products as Dow Corning's DC-Z6018, DC-6-2230 and DC-1-2530. A preferred silanol-functional silicone intermediate is manufactured by Dow Corning Corp. of Midland, Mich., under the product name DC-1-2530, which is a silanol-functional intermediate having a weight average molecular weight of approximately 10,000, and comprising approximately eighty percent solids and three percent silanol.

A composition prepared according to principles of this invention may comprise in the range of from fifteen to sixty percent by weight of the hydroxyl-containing silicon material. The composition can be prepared using either a single type of silicon material or by using a combination of different silicon materials. The hydroxy-containing silicon material reacts with the di- or polyisocyanate ingredient to eliminate the disadvantages associated with conventional isocyanate based coating compositions, e.g., to prereact the isocyanate to prevent reaction with water and eliminate carbon dioxide bubble formation and entrapment. Using less than about fifteen percent by weight of the hydroxyl-containing silicon material produces a soft or gummy composition that is unsuited for most coating and composite applications. Using greater than about sixty percent by weight of the hydroxyl-containing silicon material produces a composition that is too hard and brittle for most elastomeric coating and composite applications. A preferred composition for use as a coating comprises approximately thirty percent by weight of the hydroxly-containing silicon material.

The isocyanate-terminated urethane prepolymer created by the reaction of the isocyanate and the polyol are reacted with a hydroxyl-containing silicon material having two or more OH groups attach directly to a silicon atom, an SiOH percent of from about 0.5 to about 20, and a weight average molecular weight of about 1,000 to about 15,000. The hydroxyl-containing silicon material is reacted with the isocyanate-terminated urethane prepolymer at an OH to NCO equivalent ratio of from about 2:1 to about 6:1 to form a silanol-functionalized urethane polymer.

The reaction between the isocyanate and the hydroxyl-containing silicon material is conducted in the presence of a catalyst to accelerate the hydrolytic polycondensation reaction between the reactants. The catalyst may comprise an organotin compound. With respect to the organotin catalyst, suitable organotin catalysts may be selected from the group including dibutyltin dilaurate, dibutyltin diacetate, dibultyltin mercaptide, and the like. Preferred organotin catalysts are dibutyltin dilaurate and dibutyltin diacetate and are commercially available from Air Products of Allentown, Pa. under the product names T-1 and T-12, and by Witco Chemical Corp. of New York, N.Y. under the product name SUL-3.

A composition prepared according to principles of this invention may comprise in the range of from 0.02 to 2 percent by weight organotin catalyst. The organotin catalyst serves to accelerate the hydrolytic polycondensation of the hydroxyl-containing silicon material and the isocyanate-terminate durethane prepolymer by promoting the reaction of the hydroxyl group with the isocyanate and minimizing side reaction, e.g., the reaction of the isocyanate with water and/or urethane. Using less than about 0.02 percent by weight of the organotin catalyst does not provide an effective amount of the organotin catalyst helpful in accelerating hydrolytic polycondensation and, thus does not prevent the occurrence of undesirable side reactions with the isocyanate. Using greater than about 2 percent by weight of the organotin catalyst provides more of the organotin catalyst than needed to accelerate the hydrolytic polycondensation and, therefore is economically undesirable. A preferred composition useful as a coating comprises approximately 0.5 percent by weight organotin catalyst.

The composition can be prepared by using, in addition to the organotin catalyst, a tertiary amine catalyst. Exemplary amines include dimethylethanolamine, dimethylpropanolamine, dimethylbutanolamine, methylethylmethanolamine, methylpropylmethanol amine, methylethylethanolamine, monoisopropylamine, methyldiethanolamine, triethanolamine, diethanolamine and ethanolamine. Preferred amines include dimethylethanolamine and ethanolamine. Like the organotin catalyst, the tertiary amine catalyst also serves to accelerate the hydrolytic polycondensation of the hydroxyl-containing silicon material and the isocyanate-terminated urethane prepolymer.

Compositions prepared according to principles of this invention may comprise in the range of from 0.1 to 4 percent by weight tertiary amine. Using less than about 0.1 percent by weight of the tertiary amine will provide an insufficient amount of catalyst to effect the acceleration of the hydrolytic polycondensation. Using greater than about 4 percent by weight of the tertiary amine will provide an amount of catalyst greater than that necessary to effect the acceleration of the hydrolytic polycondensation and, thus is economically undesirable. A preferred composition useful as a coating comprises approximately two percent by weight of the tertiary amine.

With respect to the aminosilane ingredient, it may be used in lieu of the tertiary amine in combination with the organotin catalyst to accelerate the hydrolytic polycondensation reaction between the hydroxyl-containing silicon material and the isocyanate-terminated urethane prepolymer. A composition prepared according to the principles of this invention may comprise in the range of from one to four percent by weight aminosilane. Like the tertiary amine catalyst, the aminosilane also serves to accelerate the hydrolytic polycondensation of the hydroxyl-containing silicon material and the isocyanate-terminated urethane prepolymer. However, unlike the organotin and tertiary amine catalyst, the aminosilane becomes part of the SFUP polymer backbone during the polycondensation reaction.

Using less than about one percent by weight of the aminosilane will provide an inefficient amount of the aminosilane to effect the desired acceleration of the hydrolytic polycondensation reaction. Using greater than about four percent by weight of the aminosilane will provide an amount greater than needed to effect the desired hydrolytic polycondensation and, thus is economically undesirable. A preferred composition useful as a coating comprises approximately two percent by weight aminosilane. Preferred aminosilanes include aminoethylaminopropyl, trimethoxysilane and aminopropyl triethoxysilane.

With respect to the methoxy-functional silicone intermediate, preferred methoxy-functional silicone intermediates have a weight average molecular weight of about 1400 and are exemplified by such commercially available products as Dow Corning's 3074 and 3037, SY-231 manufactured by General Electric Co. of Pittsfield, Mass., and SR-191 manufactured by Wacker. The methoxy-functional silicone intermediate lowers the viscosity of the coating composition. Compositions prepared according to principles of this invention may comprise up to about twenty percent by weight of the methoxy-functional silicone intermediate. Using greater than about twenty percent of the methoxy-functional silicone intermediate produces a composition that, when used as a coating, has a high solvent content that increases drying time and reduces film. A preferred composition useful as a coating comprises approximately ten percent by weight of the methoxy-functional silicone intermediate.

With respect to the carbinol ingredient, carbinols particularly useful in the polymer are at least difunctional. Accordingly the terms glycol and polyol are used herein as being interchangeable with carbinol. Exemplary glycols may include ethylene glycol, propylene glycol, glycerol, diethylene glycol, trimethylene glycol, triethylene glycol, dipropylene glycol, tripropylene glycol, polyethylene glycols, trimethyl propanol, 1,6- or 2,6-hexanediol, neopentyl glycol, 1,3-butylene glycol, pentaerythritol, hexylene glycol, partially-esterified polyols, cyclopentanediol and the like.

Preferred carbinols include hydroxyl-functional acrylic resins, polyoxyalkaline ether glycols, polyester glycols, polycarbonate glycols, castor oil and its derivatives, polybutadiene glycols and polycarpolactone polyols and the like. The choice of carbinol will affect the mechanical properties of the cured product. For instance, if high molecular weight carbinols are used, the tensile and tear strength and percent elongation of the resulting elastomer will be lower. The addition of a high molecular weight carbinol may improve apparent drying times or improve adhesion or weatherability. The addition of a glycol or lower molecular weight carbinol will lower viscosity and may increase cure or drying time. A preferred carbinol is polyoxypropylene manufactured by ARCO under the product name Arcol 1025, which has a weight average molecular weight of approximately 1000.

Compositions prepared according to principles of this invention may comprise up to ten percent by weight of the carbinol. Using greater than ten percent by weight of the carbinol will produce a composition having a reduced isocyanate to polyol ratio and, thus having a reduced cross-link density. A reduced cross-link density causes a reduction in such desired physical properties as tensile strength and tear strength. A preferred composition useful as a coating comprises approximately ten percent by weight carbinol.

With respect to the fillers, conventional fillers can be used to prepare the composition including fillers such as silica powder, talc (magnesium silicate), clays such as china clay (aluminum silicate), wollastonite (calcium silicate), calcium carbonate, barites (barium sulfate, barium metaborate), aluminum trihydrate, graphite, zinc, aluminum, copper and the like. The composition may comprise up to about twenty percent by weight fillers. A preferred composition useful as a coating comprises approximately five percent by weight fillers.

With respect to the pigments, pigments such as iron oxide, titanium dioxide, phthalocyanine green and blue, hansa yellow and the like may be used to color the cured composition. The composition may comprise up to about twenty percent by weight pigment. A preferred composition useful as a coating comprises approximately five percent by weight pigment.

Some of the compositions of this invention require the addition of solvent to improve application by spray, roll, brush, dip and the like. Non-alcoholic solvents are preferred and include ethers, esters, aromatics and the like. Specific solvents include, for example, MEK, MIBK, n-propyl ketone, methyl isoamyl ketone, methyl amyl ketone, isobutyl acetate, butyl acetate, ethyl 3 ethoxy propionate, xylene and higher boiling aromatic solvents such as Chevron 25, hexyl acetate, heptyl acetate and the like. The amount of solvent that can be added to the composition is currently regulated by various state and federal environmental agencies to maximum of 420 grams per liter. A particularly preferred solvent is butyl acetate.

Compositions prepared according to principles of this invention may comprise additives such as pigment wetting agents, surfactants, defoamers, flow control agents, thixatropes and UV stabilizers as well as bituminous and hydrocarbon extenders and plasticizers. A composition may comprise up to about five percent by weight additives.

The composition is prepared by combining the preferred polyisocyanate, organotin catalyst, and polyol ingredients according to the previously described proportions, raising the temperature to approximately 70° C. and blending the mixture together for approximately three hours. While not wishing to be bound by any particular theory or mechanism, it is believed that the polyisocyanate and polyol react to form an isocyanate-terminated urethane prepolymer, as represented in Reaction (1) below. The reactions provided below are not intended to illustrate the entire range of chemical reactions that may occur between reactants but is only intended to illustrate and clarify the general type of chemical reaction believed to occur. Accordingly, it is to be understood that chemical reactions other than those specifically described and illustrated are within the scope of this invention.

Reaction No.1

-continued
Reaction No.1

A silanol-functionalized urethane prepolymer (SFUP) is prepared, as represented in Reaction (2) below, by combining the preferred hydroxyl-containing silicon material with the organotin catalyst, the amine catalyst, and the isocyanate-terminated urethane prepolymer according to the previously described proportions, and blending the mixture together at a temperature of approximately 70° C. for approximately four hours. It is believed that the hydroxyl-containing silicon material and the isocyanate-terminated urethane prepolymer undergo hydrolytic polycondensation to form silanol-functionalized urethane prepolymers.

based urethane prepolymers have better resistance to weathering. Isocyanate-terminated urethane prepolymers prepared from polyesters generally have better chemical and abrasion resistance. Polyether-based urethane prepolymers have good hydrolytic stability. Silanol-functional intermediates having an SiOH content of four to eight percent cure fast and have high tensile strength and hardness, while Silanol-functional intermediates having a lower SiOH content have higher elongation and lower hardness.

Compositions of this invention have several advantages compared to prior known elastomeric urethane compositions. For example, compositions prepared according to principles of this invention eliminate any isocyanate related health hazards to the end user by reaction with the hydroxyl-containing silicon material and are, therefore, more toxicologically acceptable. Compositions of this invention also eliminate the problem of carbon dioxide bubble generation and entrapment due to the prereaction of the isocyanate ingredient with the hydroxyl-containing silicon material, The reaction is typically conducted in a heated vessel equipped with an agitator, nitrogen inlet and condenser. The catalyst ingredients and hydroxyl-containing silicon compound are charged to the vessel and the isocyanate-functional urethane prepolymer is then added with continuous mixing and nitrogen blanketing. A sample is withdrawn from the vessel periodically and analyzed for unreacted isocyanate with an FTIR spectrophotometer. The reaction is complete when the FTIR spectrum shows no evidence of isocyanate of at least 2,250 centimeters$^{-1}$.

The silanol-functionalized urethane prepolymers of the present invention cure at ambient temperatures in the presence of moisture by condensation of the silanol groups to form polysiloxane polyurethane elastomers. If desired, pigments, solvents, additives and fillers can be added to the silanol-functionalized urethane prepolymer according to the previously described proportions and blended together until the mixture is uniform.

The silanol-functionalized urethane prepolymer, amine/ organotin and/or aminosilane catalyst, pigments, solvents and additives are combined to produce a single package composition system. Optionally, the amine/organotin and/or aminosilane catalyst may be packaged separately in a two-pack composition system. The composition systems are packaged in moisture proof containers, typically epoxy or phenolic lined cans and drums.

Moisture-cured polysiloxane polyurethane compositions of this invention are useful in many different applications, such as surface coatings, composite binders or the like. The isocyanate-terminated urethane prepolymer and silanol-functional silicone intermediate used to make the silanol-functionalized urethane prepolymer are selected for a particular application based on the desired physical and chemical characteristics of the polysiloxane polyurethane composition that they produce. For example, composition systems based on aromatic isocyanate urethane prepolymers have good chemical resistance while aliphatic isocyanate-thereby precluding reaction of the isocyanate ingredient with water. Elimination of bubble entrapment allows for greater film build thicknesses than allowable using prior known isocyanate-based coating compositions. Moisture-cured polysiloxane polyurethane compositions of the present invention display better weatherability and chemical resistance than prior known elastomeric polyurethanes and have surprisingly high tensile and tear strength and high elongation.

These and other features of the present invention will become more apparent upon consideration of the following nonlimiting examples. Table 1 includes a description of the ingredients used in each example.

TABLE 1

| MATERIAL | SUPPLIER | DESCRIPTION |
|---|---|---|
| DC-Z6018 | Dow Corning | silanol-functional phenylpropyl silicone intermediate with 6% SiOH, and a weight average molecular weight of 3000. |
| DC-6-2230 | Dow Corning | silanol-functional silicone intermediate with 5% SiOH, an average molecular weight of 3000. |
| Isophorone diisocyanate (IPDI) | Huls | Cycloaliphatic diisocyanate, MW = 222.3 |
| Arcol 1025 | Arco | 1000 MW polyoxypropylene ether diol |
| Arcol 425 | Arco | 425 MW polyoxy propylene ether diol |
| T-12 | Air Products | dibutyl tin dilaurate |
| Sul-3 | Witco | dibutyl tin diacetate |
| BYK-077 | Byk-Chemie | defoamer |
| BYK-080 | Byk-Chemie | defoamer |
| Nuosperse 657 | Huls | pigment wetting agent |
| R-960 | Dupont | titanium dioxide |
| Lampblack #6 | General Carbon | lamp black |

TABLE 1-continued

| MATERIAL | SUPPLIER | DESCRIPTION |
|---|---|---|
| XAPC-722 | Air Products | IPDI/polytetramethylene ether glycol urethane prepolymer, 5.75% NCO |
| butyl acetate | Union Carbide | solvent (urethane grade) |
| PM Acetate | Arco | solvent (urethane grade) |
| Dabco T-120 | Air Products | moisture cure catalyst |
| DC-Z6020 | Dow Corning | amino silane |
| Vestamin A-139 | Huls | cycloaliphatic amine |
| Epalloy 8250 | CVC | epoxy novalac resin |
| DC3074 | Dow Corning | methoxy-functional silicone |
| Imsil A-10 | Illinois Minerals | silica |
| Dilson 6500 | | polyamide wax thixatropic agent |

EXAMPLE 1

Preparation of Isocyanate-terminated Urethane Prepolymer 200.46 grams (g) of isophorone diisocyanate (IPDI), 0.17 g T-12 and 8.5 g of BYK-077 were charged to a resin flask equipped with heating mantle, agitator, nitrogen inlet, thermometer and condenser. A solution of 302.24 g Arcol 1025, 66.47 g Arcol 425, 70.14 g butyl acetate and 175 g Arco PM Acetate was prepared in another vessel and then added to the resin flask containing IPDI over a two minute period. The temperature was then raised to 70° C. and held at constant temperature for three hours and 15 minutes with continuous agitation and nitrogen blanketing. The resulting isocyanate-terminated prepolymer had a solids content of approximately 70 weight percent, an isocyanate content of approximately 4.40 weight percent and a Brookfield viscosity of approximately 2480 centipoise (cP).

Preparation of Silanol-functionalized Urethane Prepolymer 339.9 g of DC-Z6018 was dissolved in 183 g of butyl acetate in a resin flask equipped with heating mantle, agitator, nitrogen inlet, thermometer and condenser. When the DC-Z6018 was completely dissolved, 0.4 g of T-12 was added and mixed until uniform. Approximately 477.3 g of the isocyanate-terminated urethane prepolymer prepared above was added to the DC-Z6018 solution over a two minute period. The temperature was raised to 70° C., then held for four hours at the same temperature with continuous stirring and nitrogen blanketing. The FTIR spectrum of the resulting silanol-functionalized urethane prepolymer showed no evidence of isocyanate. The Brookfield viscosity was approximately 3200 cP and the solids content was approximately 67.4 weight percent.

Preparation of Pigmented Silanol-functionalized Urethane Prepolymer

Approximately 150 g of the silanol-functionalized urethane prepolymer prepared above, 4 g Nuosperse 657, and 6 g BYK-080 were charged to a 1 quart can. Approximately 60 g of R-960 titanium dioxide and 3 g Lampblack #6 were added and the mixture was dispersed to 3 Hegman fineness of grind using a Cowles dissolver. This required about ten minutes. An additional 450 g of silanol-functionalized urethane prepolymer was added and the composition was mixed until uniform.

EXAMPLE 2

Airthane XAPC-722, a commercially available isocyanate-terminated urethane prepolymer supplied by Air Products was used in this example. Airthane XAPC-722 is based on isophorone diisocyanate and polytetramethylene ether glycol. It is 100 percent solids and has an isocyanate content of 5.75 percent.

Preparation of Silanol-functionalized Urethane Prepolymer 245.9 g of DC-Z6018 was dissolved in 158 g of butyl acetate in a resin flask equipped as described above. 2 g of Sul-3 and 8 g of BYK-080 were added and mixed until uniform. A solution of 219.1 g of XAPC-722 and 158 g of butyl acetate was prepared in another resin flask and then added to the DC-Z6018 solution over a two minute period. The temperature was raised to 49° C. and held at constant temperature for eight hours with continuous agitation and nitrogen blanketing. The resulting silanol-functionalized urethane prepolymer had a Brookfield viscosity of approximately 4000 cP and a solids content of approximately 60 weight percent. The FTIR spectrum showed no evidence of isocyanate.

Preparation of Pigmented Silanol-functionalized Urethane Prepolymer

A pigmented composition was prepared as follows: 150 g of the silanol-functionalized urethane prepolymer, 4 g of Nuosperse 657, and 6 g BYK-080 were charged to a one quart can. Approximately 60 g of R-960 titanium dioxide and 3 g Lampblack #6 were added and the mixture was dispersed to 3 Hegman fineness of grind using a Cowles dissolver. An additional 450 g of the silanol-functionalized urethane prepolymer was added and the composition was mixed until uniform.

EXAMPLE 3

Example 3 was prepared in the same manner as Example 2. The materials used were 306 g of DC-6-2230, 350.1 g of butyl acetate, 4 g of T-12 and 219.1 g of XAPC-722. The resulting silanol-functionalized urethane prepolymer had a solids content of approximately 60 weight percent and a Brookfield viscosity of approximately 3800 cP. The FTIR Spectrum showed no evidence of isocyanate.

COMPARATIVE EXAMPLE 4

500 g of XAPC-722 was dissolved in 125 g of xylene in a one quart can using a paddle type mixer. The mixture had a Brookfield viscosity of approximately 1000 cP and a calculated isocyanate content of 4.6 weight percent.

COMPARATIVE EXAMPLE 5

Comparative Example 5 uses the same urethane prepolymer solution described in comparative Example 4.

Examples 1 through 5 were combined with the catalysts and/or curatives and solvents as shown in Table 2. The compositions were spray applied as a coating on 3"×8"×1/16" hot-rolled steel panels with Bonderite 1000 treatment using a Devilbiss suction gun. Each panel was allowed to cure at 70° F. (21° C.) and 50% RH for two weeks before measuring 60° gloss and conducting QUV accelerated weathering tests. Free films of each example were prepare using 20 mil and 40 mil Leneta drawdown bars on polyethylene sheet. After two days, each film was removed from the polyethylene sheet and allowed to cure for two weeks at 70° F. (21° C.) and 50% relative humidity before conducting chemical resistance tests and measuring hardness, tensile strength and percent elongation. A summary of the test methods is shown in Table 3.

TABLE 2

| COATING COMPOSITION | 1 | 2 | 3 | 4 | 5 |
| --- | --- | --- | --- | --- | --- |
| Example 1 | 100 | — | — | — | — |
| Example 2 | — | 100 | — | — | — |
| Example 3 | — | — | 100 | — | — |
| Comparative Example 4 | — | — | — | 100 | — |
| Comparative Example 5 | — | — | — | — | 100 |
| butyl acetate | 10 | 20 | 10 | 5 | 10 |
| DC-Z6020 | 2 | 2 | 2 | — | — |
| T-12 | 1 | 1 | 1 | — | — |
| Dabco T-120 | — | — | — | 2 | — |
| Vestamin A-139 | — | — | — | — | 14.5 |
| Dry to touch @ 20 mils (hrs) | 4 | 3 | 4 | 6 | 3 |
| Dry through @ 2 mils (hrs.) | 30 | 24 | 24 | 36 | 12 |
| Hardness, Shore A | 60 | 80 | 75 | 50 | 80 |
| Tensile strength, psi | 1500 | 2100 | 1800 | 1000 | 3000 |
| Elongation, % | 400 | 205 | 170 | 500 | 260 |
| QUV Accelerated Weathering | | | | | |
| 60° Gloss | | | | | |
| initial | 55 | 62 | 91 | 94 | 95 |
| 4 weeks | 40 | 45 | 70 | 50 | 45 |
| 8 weeks | 24 | 35 | 55 | 20 | 15(1) |
| Appearance (40 mil drawdowns) | (a) | (a) | (a) | (b) | (c) |
| Chemical resistance, 24 hour spot tests | | | | | |
| sodium hydroxide (50%) | 10 | 10 | 10 | 10 | 10 |
| hydrochloric acid (37%) | 8 | 8 | 8 | 8 | 8 |
| sulfuric acid (98%) | 4 | 8 | 4 | 2 | 2 |
| phenol (89%) | 4 | 4 | 4 | 2 | 2 |
| phosphoric acid (85%) | 6 | 8 | 6 | 4 | 4 |
| acetone | 10 | 10 | 10 | 10 | 10 |
| ammonium hydroxide (28%) | 10 | 10 | 10 | 10 | 10 |
| ethyl alcohol (95%) | 8 | 8 | 8 | 8 | 8 |
| acetic acid (99%) | 4 | 6 | 6 | 2 | 2 |
| cumene | 10 | 10 | 10 | 10 | 10 |

(a) continuous, bubble free film
(b) bubble entrapment, foamy
(c) some bubble formation
(1) yellowing, cracking, crazing

TABLE 3

| TEST | TEST METHOD |
| --- | --- |
| Dry times | ASTM D1640 |
| QUV accelerated weathering | ASTM G53 (UV 313B BULB) |
| Hardness, Shore A | ASTM D2240 |
| Tensile strength | ASTM D412 |
| Elongation | ASTM D412 |
| Impact resistance | ASTM D2794 |
| Taber abrasion | ASTM D4060 |
| Chemical resistance | ASTM D1308 |

10 = No change
8 = Slight change
6 = Definite change
4 = Major change
2 = Partial failure
0 = Complete failure A comparison of the data presented in Table 2 clearly indicates that compositions of the present invention have improved weatherability and chemical resistance compared to prior known moisture-cured urethane coating compositions, and also have high tensile strength and elongation.

The bubble entrapment and foamy appearance of the 40 mil draw downs of Comparative Examples 4 and 5 clearly indicates that the compositions of the present invention are capable of being applied in thicker section than conventional moisture-cured isocyanate based urethane coating compositions.

The silanol-functionalized urethane prepolymers of the present invention may also be used to toughen silicone and polysiloxane compositions. The flexibility, impact and abrasion resistance of such compositions can be improved by partial replacement of (or addition to) the silanol-functional silicone resin component(s) with silanol-functionalized urethane prepolymer.

Example 6 is an aminosilane cured polysiloxane epoxy coating comprising the ingredients shown in Table 4. Example 7 is the same coating with fifteen weight percent addition of the silanol-functional urethane prepolymer of Example 2.

| Example | 6 | 7 |
| --- | --- | --- |
| Epalloy 8250 | 437.1 | 437.1 |
| BYK-080 | 12.9 | 12.9 |
| R-960 | 233.4 | 233.4 |
| Imsil A-10 | 146.8 | 146.8 |
| Dislon 6500 | 10.0 | 10.0 |
| DC3074 | 374.4 | 374.4 |
| Example 2* | — | 18.2 |

*Silanol-functionalized urethane prepolymer from Example 2.

The ingredients were dispersed to 3 Hegmen fineness of grind with a Cowles dissolver. One hundred grams of each example was mixed with 18.1 grams of Dow Corning's Z6020 aminosilane and applied at 20 mils wet film thickness on 4½"×7½"×1/32" sandblasted steel panels using a Leneta drawdown bar. Taber abrasion panels of Example 6 and Example 7 were prepared by spray application after thinning each formula twenty percent by weight with butyl acetate.

After two weeks cure at 70° F. (21° C.) and 50% relative humidity, Example 6 had a direct impact resistance of 34 in./lbs and 119 milligrams weight loss in the Taber (abrasion) test compared to 52 in./lbs impact resistance and 85 milligrams weight loss in the Taber (abrasion) test for Example 7. This data indicates the utility of the silanol-functional urethane prepolymers of the present invention in improving the impact and abrasion resistance of polysiloxane based compositions.

Although limited embodiments of polysiloxane polyurethane compositions have been described herein, many modifications and verifications will be apparent to those skilled in the art. Accordingly, it is to be understood that, within the scope of the appended claims, polysiloxane polyurethane compositions according to principles of this invention may be prepared other than as specifically described herein.

What is claimed is:

1. A silanol-functionalized urethane prepolymer composition prepared by combining:

an organic di- or polyisocyanate having the formula where the $R_1$ group is selected from the group consisting of aliphatic, cycloaliphatic, and aromatic groups; with a polyol that can react with the organic di- or polyisocyanate to form an isocyanate terminated urethane prepolymer, and combining with the isocyanate terminated urethane prepolymer;

a silanol-functional silicone intermediate having the formula where each $R_8$ is independently selected from the group consisting of hydrogen, alky, and aryl groups having up to about twelve carbon atoms, and where each $R_9$ is independently selected from the group consisting of hydroxy, alkyl, and aryl groups having up to about six carbon atoms.

2. A silanol-functionalized urethane prepolymer composition prepared by combining:

an organic di- or polyisocyanate having the formula where the $R_1$ group is selected from the group consisting of aliphatic, cycloaliphatic, and aromatic groups; with a polyol that can react with the organic di- or polyisocyanate to form an isocyanate terminated urethane prepolymer, and combining with the isocyanate terminated urethane prepolymer;

a silanol-functional silicone intermediate having the formula where each $R_8$ is independently selected from the group consisting of hydrogen, alkyl, and aryl groups having up to about twelve carbon atoms, and where each $R_9$ is independently selected from the group consisting of hydroxy, alkyl, and aryl groups having up to about six carbon atoms, in the presence of;

an organotin catalyst; and an amine catalyst to form the silanol-functionalized urethane prepolymer.

3. A silanol-functionalized urethane prepolymer that is prepared by combining;

an organic di- or polyisocyanate having the formula where the $R_1$ group is selected from the group consisting of aliphatic, cycloaliphatic, and aromatic groups; with a polyol that reacts with the di- or polyisocyanate to form an isocyanate terminated urethane prepolymer, the polyol having the formula where the $R_2$ group is selected from the group consisting of polyester, polyether, polyalkyldiene, and glycol groups, and combining with the isocyanate terminated urethane prepolymer;

a silanol-functional silicone intermediate having the formula where each $R_8$ is independently selected from the group consisting of hydrogen, alkyl, and aryl groups having up to about twelve carbon atoms, and where each $R_9$ is independently selected from the group consisting of hydroxy, alkyl, and aryl groups having up to about six carbon;

an organotin catalyst selected from the group consisting of dibutyltin dilaurate, dibutyltin diacetate, and dibutyltin mercaptide; and an amine catalyst selected from the group consisting of tertiary amines and aminosilanes.

4. A silanol-functionalized urethane prepolymer prepared by combining:

an isocyanate-terminated urethane prepolymer; with a silanol-functional silicone intermediate having the formula where each $R_8$ is independently selected from the group consisting of hydrogen, alkyl, and aryl groups having up to about twelve carbon atoms, and where each $R_9$ is independently selected from the group consisting of hydroxy, alkyl, and aryl groups having up to about six carbon atoms.

5. The silanol-functionalized urethane prepolymer composition as recited in claim 2 wherein the organic di- or polyisocyanate has the formula where the $R_1$ group is selected from the group consisting of aliphatic, cycloaliphatic, and aromatic groups, and where the di- or polyisocyanate has a weight average molecular weight in the range of from 200 to 2,000.

6. The silanol-functionalized urethane prepolymer composition as recited in claim 2 wherein the polyol has the formula where the $R_2$ group is selected from the group consisting of polyester, polyether, polyalkyldiene, and glycol groups, and where the polyol has a weight average molecular weight in the range of from about 200 to 5,000.

7. The silanol-functionalized urethane prepolymer composition as recited in claim 1 further comprising an amine catalyst.

8. The silanol-functionalized urethane prepolymer composition as recited in claim 1 further comprising fillers and pigments.

9. The silanol-functionalized urethane prepolymer composition as recited in claim 1 further comprising solvents and additives selected from the group consisting of pigment wetting agents, surfactants, defoamers, flow control agents, thixatropes, UV stabilizers, bituminous and hydrocarbon extenders, and plasticizers.

10. A composite comprising a binder formed from the silanol-functionalized urethane prepolymer composition recited in claim 1, and having a reinforcing material placed in contact with the binder.

11. The silanol-functionalized urethane prepolymer composition as recited in claim 1 comprising in the range of from two to fifty percent by weight di- or polyisocyanate, and in the range of from two to sixty percent by weight polyol.

12. The silanol-functionalized urethane prepolymer composition as recited in claim 5 comprising in the range of from two to fifty percent by weight of the organic di-or polyisocyanate.

13. The silanol-functionalized urethane prepolymer composition as recited in claim 6 comprising in the range of from two to sixty percent by weight of the polyol.

14. The silanol-functionalized urethane prepolymer composition as recited in claim 2 comprising in the range of from fifteen to sixty percent by weight hydroxyl-containing silicon material.

15. The silanol-functionalized urethane prepolymer composition as recited in claim 2 comprising in the range of from two to fifty percent by weight organic di- or polyisocyanate, in the range of from two to sixty percent by weight polyol, and in the range of from fifteen to sixty percent by weight silanol-functional silicone intermediate.

16. A composite having a binder formed from the silanol-functionalized urethane prepolymer composition as recited in claim 2, and having a reinforcing material placed in contact with the binder.

17. The silanol-functionalized urethane prepolymer composition as recited in claim 1 wherein the polyol has the formula $$HO-R_2-OH$$

where the $R_2$ group is selected from the group consisting of polyester, polyether, polyalkyldiene, and glycol groups, and where the polyol has a weight average molecular weight in the range of from about 200 to 5,000.

18. The silanol-functionalized urethane prepolymer composition as recited in claim 1 further comprising an organotin catalyst selected from the group consisting of dibutyltin dilaurate, dibutyltin diacetate, and dibutyltin mercaptide.

19. The silanol-functionalized urethane prepolymer composition as recited in claim 1 further comprising a methoxy-functional silicone intermediate having the formula where each $R_{18}$ group is independently selected from the group consisting of alkyl, aryl, and alkoxy groups having up to about six carbon atoms, where each $R_{19}$ group is independently selected from the group consisting of hydrogen, alkyl, and aryl groups having up to about twelve carbon atoms, and where $n_4$ is selected so that a weight average molecular weight of the silicone intermediate is in the range of from 500 to 6,000.

20. The silanol-functionalized urethane prepolymer composition as recited in claim 7 wherein the amine catalyst is selected from the group consisting of tertiary amines and aminosilanes, wherein the aminosilanes have the formula where $R_{14}$ is selected from the group consisting of aliphatic and aromatic amines comprising in the range of from one to six nitrogen atoms and in the range of from one to six carbon atoms, and where $R_{15}$, $R_{16}$, and $R_{17}$ are independently selected from the group consisting of alkoxy and aryloxy groups having up to about twelve carbon atoms.

* * * * *